DATA COMMUNICATION SYSTEM

Filed Aug. 13, 1964 5 Sheets-Sheet 1

INVENTOR
DONALD L. SMITH
BY *Blair E. Buckles*
ATTORNEYS

DATA COMMUNICATION SYSTEM

Filed Aug. 13, 1964

INVENTOR
DONALD L. SMITH
BY Blair E. Buckles
ATTORNEYS

INVENTOR
DONALD L. SMITH
BY Blair & Buckles
ATTORNEYS

April 16, 1968 D. L. SMITH 3,378,820

DATA COMMUNICATION SYSTEM

Filed Aug. 13, 1964 5 Sheets-Sheet 4

INVENTOR
DONALD L. SMITH
BY Blair & Buckles
ATTORNEYS

FULL DUPLEX SYSTEM

INVENTOR
DONALD L. SMITH
BY Blair & Buckles
ATTORNEYS

United States Patent Office 3,378,820
Patented Apr. 16, 1968

3,378,820

DATA COMMUNICATION SYSTEM

Donald L. Smith, Stow, Mass., assignor to Digital Equipment Corporation, Maynard, Mass.

Filed Aug. 13, 1964, Ser. No. 389,242
18 Claims. (Cl. 340—172.5)

ABSTRACT OF THE DISCLOSURE

Interface apparatus for establishing communication between a digital data processor and plural data lines automatically identifies which data transmitter and/or receiver connected to the data lines is ready to transfer information with the data processor and sends this information to the data processor. Upon instruction, the interface apparatus channels data between the data processor and a selected data line. Also upon command, the interface apparatus causes a receiver to monitor the transmission from a selected transmitter, thereby enabling the data processor to check the accuracy of the transmission.

This invention relates to the transmission of digital information on a plurality of independent data lines, such as Teletype lines, connected with one central location. More specifically, it relates to novel logic apparatus connected between centrally located data processing equipment and a plurality of data lines on which the data processing equipment receives and transmits digital information. The apparatus, conveniently termed interface apparatus, operates with efficient logic and hence requires relatively few switching devices. The invention also concerns a novel method for operating such apparatus.

In general, high speed data processing equipment can handle information at many times the rate at which it is developed or later utilized. Accordingly, a single computer can often be connected with several information sources and several output devices, as well as with other computers handling related information.

For example, air line reservations are placed through many field offices. These offices are connected by Teletype lines with a central office in which a computer stores the details for each scheduled flight and the reservations already made for each flight. In placing a reservation, the field office sends the central computer the information regarding the passenger's desired flight, or inquires which flights have seats available. At the central location, this information has to be fed to the computer together with inquiries received from other field offices. The central office computer quickly answers each request, by sending the field office a confirmation for a requested reservation or furnishing the requested information regarding available seats. Moreover, immediately prior to a flight, the central computer is often requested to send the airports along the route a list of inbound and outbound reservations.

Another example of interconnected data processing equipment is found in the securities business. The quotations regarding each transaction are transmitted over Teletype lines between the offices participating in the transaction, as well as through a central clearing house. Also, throughout each business day, different field offices request the central office to send listings of current prices.

Data communication systems of this kind utilize interface equipment between the central data processing equipment and the data lines. The interface equipment feeds the incoming information to the computer and transmits information from the computer on a data line the computer selects.

An object of the present invention is to provide apparatus for connection between central data processing equipment and a plurality of data lines to enable the central equipment to communicate on different data lines.

Another object is to provide apparatus of the above character for full duplex, for half-duplex and one way Teletype operation.

It is also an object of the invention to provide apparatus for connection between central data processing equipment and a plurality of terminal devices, such as information gathering and/or display devices, making possible communication between each terminal device and the central equipment.

Another object of the invention is to provide apparatus of the above type that operates with efficient logic. Attaining this object will enable the apparatus to be constructed with relatively few logic elements and to perform operations in a short time.

A further object of the invention is to provide data processing apparatus for connection between a central computer and a plurality of data lines and which enables the computer to verify the accuracy of its transmitting operation during half-duplex operation.

It is also an object of the invention to provide apparatus of the above type which operates on a character-by-character basis. Such apparatus must operate with sufficient speed to process one character from each line before a subsequent character is received on a line. Otherwise, received characters may be lost.

Another object of the invention is to provide apparatus of the above type which allows the computer to process information whose arrival is not synchronized with the operation of the computer.

It is also an object of the invention to provide a method for operating digital apparatus of the above character.

Other objects of the invention will in part be obvious and will in part appear hereinafter.

The invention accordingly comprises the several steps and the relation of one or more of such steps with respect to each of the others, and the apparatus embodying features of construction, combination of elements and arrangement of parts which are adapted to effect such steps, all as exemplified in the following detailed disclosure, and the scope of the invention will be indicated in the claims.

For a fuller understanding of the nature and objects of the invention, reference should be had to the following detailed description taken in connection with the accompanying drawings, in which.

Figure 1:
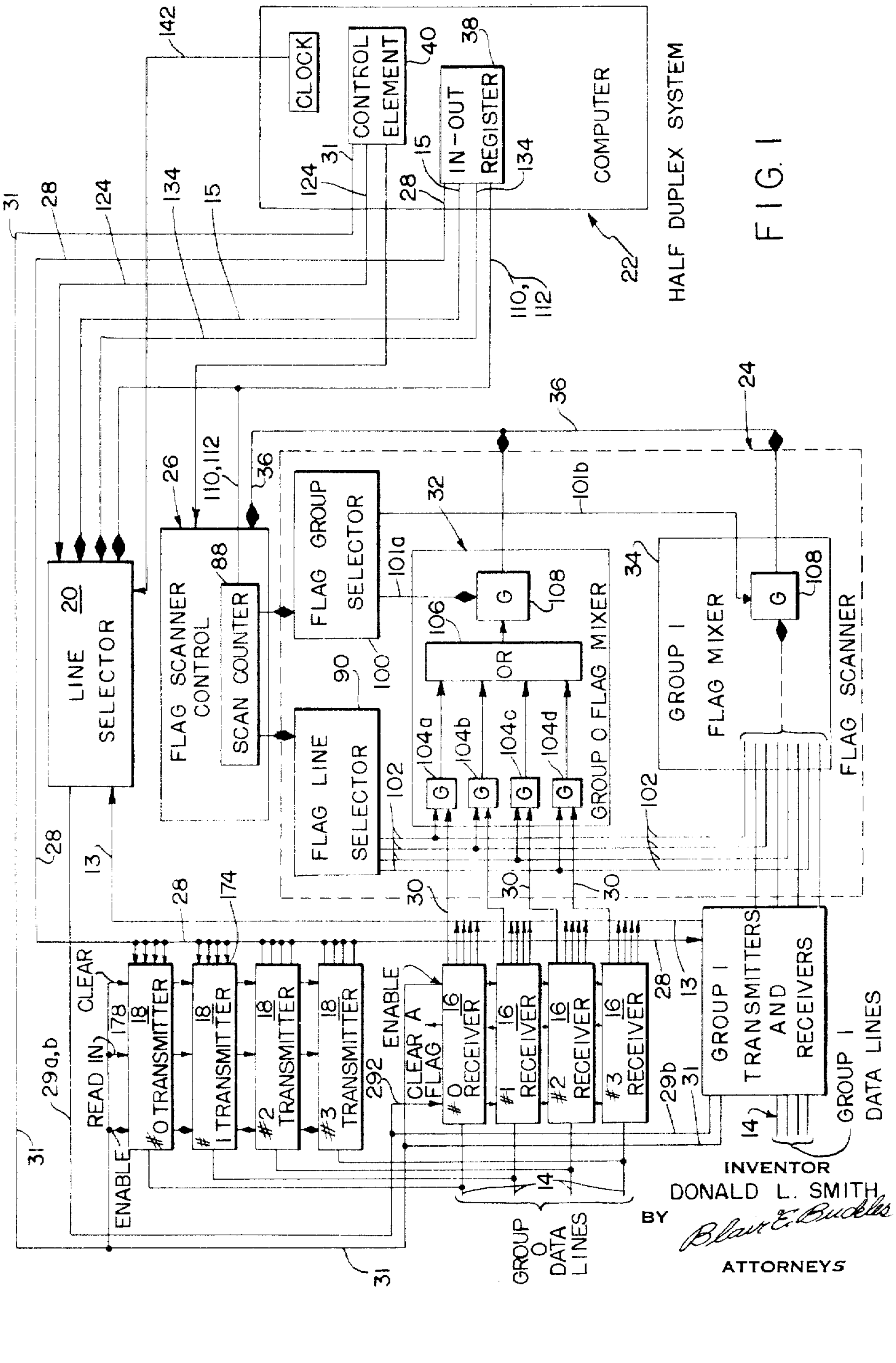
FIGURE 1 is a schematic representation of a half-duplex Teletype system embodying the invention.

As used herein, the term "character" means a coded sequence of digits representing one character. Teletype characters conventionally comprise five, six or eight binary digits arranged according to a code such as the 5-digit Baudot code.

GENERAL DESCRIPTION

In general, interface equipment embodying the invention includes a scanner that examines Teletype receivers connected to data lines to find a data line on which a complete character has been received. The scanner sends a signal identifying this line to a line selector that transfers the received character to the computer. The line selector is synchronized with the computer; otherwise the interface equipment operates independently of the computer.

When the computer is to transmit a character, it transfers the corresponding digits to a transmitter register and instructs the line selector as to which line the character is to be sent on. The line selector then operates the transmitter associated with the identified line to send the character out.

The interface equipment preferably processes information character by character, rather than on a word basis. That is, it operates with sufficient speed to receive or transmit a character on a data line and to handle a character on each of the other data lines before handling a second character for the first line.

To ensure accurate character transmission during half-duplex operation, the receiver associated with the line on which the character is being transmitted can be operated to receive the character simultaneously with its transmission. When the receiver has the complete character, it transfers the character via the line selector to the computer, which compares the received character with the character it instructed the transmitter to send.

Alternatively, the transmission check can simply inform the computer that a complete character has been sent on the line the computer identified for transmission. The resultant assurance that the transmitter has placed a complete character on the line is sufficient in many cases.

The invention is described initially with reference to a half-duplex Teletype system. This is a system in which the terminal apparatus connected to each end of a data line can both send and receive information, but performs only one of these operations at a time. In a full duplex system, on the other hand, different data lines are used for transmitting and for receiving. Thus, these two operations can be carried out independently from each other.

To aid in understanding the drawings, the following nomenclature is used herein. Each flip-flop has a ONE state and a ZERO state. The ONE state is imposed by a signal applied to the ONE or "set" input terminal of the flip-flop; the ZERO state is imposed by a signal at the ZERO or "clear" input. When in the ONE state, the flip-flop provides a ONE output signal at a ONE output terminal; when in the ZERO state, it provides a ZERO output signal at its ZERO output terminal.

The inputs to the flip-flops include circuitry, such as a differentiating capacitor, for converting changes in level-type signals to pulses. The diamonds on the interconnecting lines indicate level-type signals and the arrows indicate pulse signals.

Referring now to FIGURE 1, half-duplex Teletype interface apparatus embodying the invention has data receivers 16 and transmitters 18 connected to data lines 14. The illustrated data lines are arranged in two groups, group 0 and group 1, of four lines each, with each receiver and transmitter being connected with one line.

A line selector indicated generally at 20 is connected, by means of buses 13 and 15, between the receivers 16 and a computer indicated generally at 22. The selector 20 transfers received characters from the receivers 16 to the computer. For transmission, the computer 22 is connected directly with the transmitters 18 via a transmitter bus 28. A control cable 29 from the line selector 20, and a control cable 31 from the computer 22, apply signals to the receivers and transmitters to control the transmitting and receiving operations.

The interface equipment also includes a flag scanner indicated generally at 24 and a flag scanner control indicated generally at 26. The scanner control 26 operates the flag scanner 24 to sense which receiver 16 has received a character from its data line and to deliver to the line selector 20 the identity of this data line.

Considering the system of FIGURE 1 in greater detail, when a receiver 16 has received a complete character, it develops a Flag signal at a "flag" output 30. The outputs 30 of the receivers in group 0 are connected to a flag mixer 32 in the flag scanner 24, and a separate flag mixer 34 is connected to the flag outputs of the group 1 receivers.

As described below, the flag scanner simultaneously couples all the receiver flag outputs of group 0 to the flag scanner control 26 via a flag line 36. If the scanner control does not receive a Flag signal from group 0, it instructs the flag scanner to couple it to the flag outputs from the group 1 receivers. If no signals are received from group 1, the scanner 24 returns to group 0, and so on. This operation of the flag scanner, whereby groups a flag outputs are sensed, is referred to as group scanning.

When the scanner control 26 receives a Flag signal while group scanning, it instructs the flag scanner 24 to interrupt group scanning and commence line scanning. That is, the scanner 24 then couples to the scanner control the flag outputs, one at a time, from the receivers in the group having the Flag signal. Upon receipt of a Flag signal developed while line scanning, the scanner control 26 stops the flag scanner 24 and sends to the computer 22, generally to its control element 40, a Computer Notification signal.

Also upon receipt of a Flag signal developed while line scanning, the scanner control 26 develops an identifying signal. This signal identifies the group and line numbers associated with the receiver that produced the Flag signal to which the scanner control responded. In the illustrated system this signal is a composite of two binary numbers. The Identifying signal is applied to the line selector 20 and to an in-out register 38 of the computer 22. According to an input and output storage operations called for by the particular computer 22 and its program, the in-out register 38 may comprise separate input and output registers. Further, the register 38 may be constructed as an accumulator register, as a core memory register or the like.

After the character in the identified receiver has been processed, the scanner control 26 resumes line scanning in the same group it found the Flag signal, to ensure that any other Flag signals in that group are recognized. Upon completion of line scanning in this group, the scanner reverts to group scanning until another Flag signal is detected, and then scans the lines in the corresponding group to identify the receiver producing the newly found Flag signal.

Upon receipt of a command from the computer, the line selector 20 transfers to the computer's in-out register 38 the character in the receiver identified by the Identifying signal. Simultaneously, the scanner control 26 clears the Flag signal from the identified receiver.

In this manner, the computer 22 obtains information from the data lines on a character by character basis, with all data lines being scanned between delivery of two successive characters from the same line.

The computer 22 transmits a character by delivering to the line selector 20, via the bus 15, the group and line numbers of the data line on which the character is to be sent, and by sending the character via the transmitter bus 28 to all the transmitters 18. Upon receipt of a command from the computer, the line selector 20 causes the identified transmitter to accept the character and send it out on the corresponding data line 14.

When desired, during half-duplex operation, the computer can be programmed to check the accuracy of each transmitted character simultaneously with its transmission. For this "echo check" operation, the computer's control element 40 operates the receiving portion of the interface equipment along with the transmitting portion. Accordingly, as a character is delivered to a data line by a transmitter, the corresponding receiver receives the character. The receiver turns on its Flag signal when it has received the complete character, and the flag scanner 24 and scanner control 26 inform the line selector 20 and the computer of the receiver's line and group identity.

The computer then obtains from the line selector the character in this receiver, and compares it with the character it commanded to be sent out. The computer can thus correct any errors in the character actually placed on the data line before proceeding with its next instruction.

A Flag signal from the receiver connected to the data line on which a character is to be transmitted indicates that a complete character has actually been transmitted. This information not only informs the computer that the interface equipment is ready to process another character, but can also provide an alternative check on the accuracy of the transmitting operation. This alternative check requires less time, but is less complete than the echo check.

*Teletype receiver*

Figure 2:
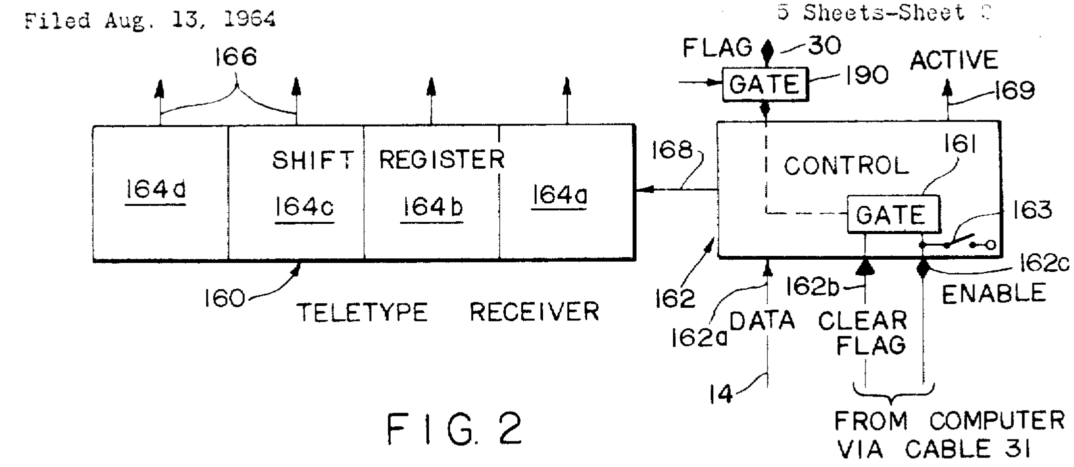
FIGURE 2 is a schematic representation of a Teletype receiver for use in the system of FIGURE 1.

FIGURE 2 shows in block form a Teletype receiver construction suitable for the receivers 16 of FIGURE 1. A receiver of this type is marketed by Digital Equipment Corporation, Maynard, Mass., under the designation 4703. The illustrated receiver is constructed with a shift register indicated generally at 160 and a control indicated at 162. The shift register 160 utilizes a flip-flop 164 for each digit in a character. For the illustrated system operating with four-bit characters, the shift register has four sequentially ordered flip-flops **164*a*–164*d*. The state or content of each flip-flop is sensed at a terminal 166. The shift register is connected at a terminal 168 with the control 162** to receive character information and other signals.

The control 162, constructed according to conventional techniques with electronic logic elements functioning as flip-flops, coincidence circuits, and the like, has a "data" input **162*a*, a "clear flag" input 162*b* and an "enable" input 162*c*. Outputs from the receiver control 162 include the character information and other signals applied to the shift register 160 at the terminal 168, the Flag signal developed at the flag output 30 and a Receiver Active signal developed at an output 169. A gate 190 associated with the flag output 30** will be discussed hereinafter.

In essence, the control 162 and the shift register 160 operate as a serial-to-parallel converter. The receiver receives the digits of a character in serial form from a Teletype line 14 and presents them in parallel form at the terminals 166.

The Flag signal, developed at the terminal 30 when the last, fourth, digit of a character is placed in the shift register 160, i.e. in the flip-flop **164*a*, indicates to external equipment that a character has been received and assembled in the shift register. The Flag signal is cleared, or turned off, by a signal applied to the clear flag input 162*b*** of the receiver.

As in conventional Teletype terminal equipment, the control 162 of the receiver shown in FIGURE 2 also may receive timing pulses from a clock (not shown) to synchronize its operation with associated data processing equipment. For example, the timing pulses may cause the receiver to sample the data on the lines 14 at selected intervals. In addition the receiver may have a provision for disabling it with an external signal so that incoming data is not read into its shift register.

*Teletype transmitter*

Figure 3:
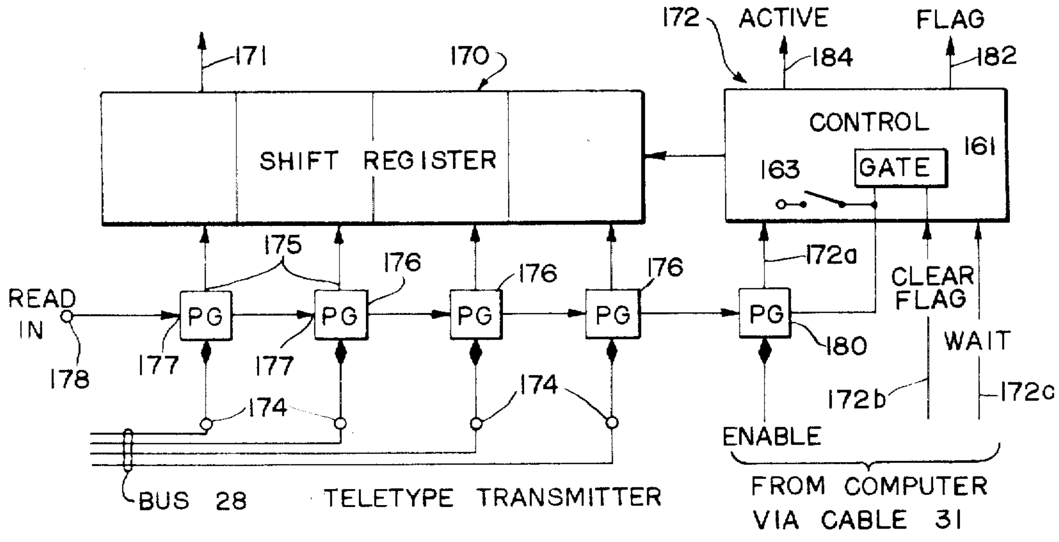
FIGURE 3 is a schematic representation of a Teletype transmitter for use in the system of FIGURE 1.

A construction for a Teletype transmitter suitable for the transmitters 18 of FIGURE 1 is shown in FIGURE 3 and utilizes a transmitter control 172 and a four-stage shift register 170 having an output terminal 171. The output terminal 171 is connected to a data line 14. A transmitter of this type is marketed by Digital Equipment Corporation under the designation 4702.

Whereas the receiver of FIGURE 2 operates essentially as a serial-to-parallel converter, the transmitter of FIGURE 3 operates as a parallel-to-serial converter. Accordingly, the transmitter has four input terminals 174 to which the computer in-out register 38 applies digits of a character, by means of bus 28, in parallel form. Signals at the terminals 174, e.g. binary ONES, condition pulse gates 176 to pass pulses, developed in the line selector 20, from a read-in terminal 178 to the respective stages of the shift register 170.

During operation, the pulse gate terminals 174 receive the corresponding digits of a character to be transmitted. The next pulse at the terminal 178 then causes the ONES in the character to be placed in the corresponding stages of the register 170. The register having been previously cleared, the remaining stages will contain the ZEROS in the character. In this manner, the character to be transmitted is fed into the transmitter in parallel.

The read-in terminal 178 is also connected to the input of a pulse gate 180 conditioned by a Transmitter Enable signal. The output of the gate 180 initiates transmission by the transmitter. Specifically, it causes the control 172 to read the character out of the shift register 170 in serial form and onto the data line 14 connected to its output terminal 171.

The transmitter control 172 also has a "clear flag" input terminal **172*b* and a "wait" input terminal 172*c*. Its outputs include a "transmitter flag" output terminal 182 and an "active" output terminal 184, as well as a connection to the shift register 170**.

The control 172 develops an "active" signal at the terminal 184 during the period that the transmitter is transmitting digits at the output terminal 171. As discussed below, the Transmitter Active signal may be applied to the receiver connected to the same line 14, so as to inhibit the receiving operation thereof while a character is being transmitted.

The Wait signal of the transmitter may be used during certain Teletype operations when it is desired to inhibit transmission until another operation is completed.

The receiver and transmitter constructions of FIGURES 2 and 3 are presented only by way of illustration. The invention is not limited to any particular receiver and transmitter constructions. A skilled data processing engineer can construct other receivers and transmitters for use with interface equipment embodying the invention.

*Flag scanner and scanner control*

Figure 4:
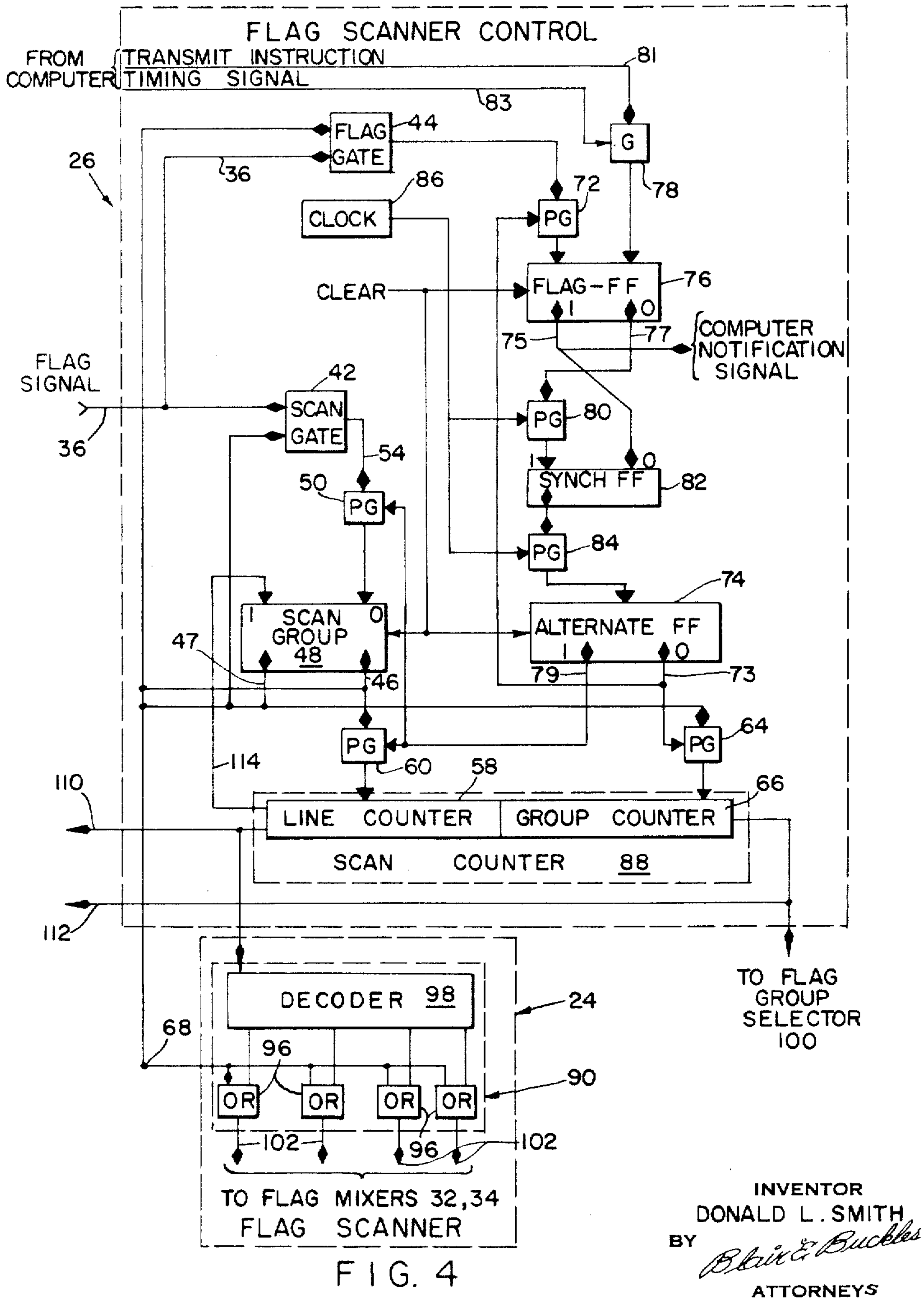
FIGURE 4 is a schematic representation of the flag scanner control in the system of FIGURE 1.

FIGURE 4 shows a detailed construction for the flag scanner control 26 and a portion of the flag scanner 24 of FIGURE 1. In the scanner control 26, the flag line 36 from the flag mixers 32 and 34 (FIGURE 1) goes to one input of a scan gate 42 and of a flag gate 44. The other input to the scan gate 42 is from the ONE output terminal 47 of a scan group flip-flop 48. The second input to the gate 44 is from the ZERO output terminal 46 of the flip-flop 48. The output of the scan gate 42 conditions a pulse gate 50 connected to the ZERO input terminal of the flip-flop 48.

The flip-flop 48, which is cleared to the ZERO condition by the output pulses from the pulse gate 50, is connected by a line 114 with a line counter 58 so as to be set, i.e. placed in the "ONE" condition, when the line counter reaches the end of its count. The ZERO output from the flip-flop 48 is also delivered to the conditioning input of a pulse gate 60, which passes pulses to be counted by the counter 58.

The ONE output terminal 47 of the scan group flip-flop 48 is connected to the conditioning input of a pulse gate 64 whose output terminal is connected to the input terminal of a group counter 66. The ONE output terminal 47 is connected also to an input terminal 68 of a flag line selector 90 in the flag scanner 24.

As also shown in FIGURE 4, the flag gate 44 develops an output in response to the coincidence of a Flag signal and a ZERO signal from the flip-flop 48. The gate's output conditions a pulse gate 72 that, together with the pulse gate 64, receives its input signal from the ZERO output terminal 73 of an alternate flip-flop 74. The output of the gate 72 sets a flag flip-flop 76 whose ONE output terminal 75 develops the Computer Notification signal that is sent to the computer when a receiver 16 is identified as having a character.

The ZERO input signal for the flag flip-flop 76 is derived from a gate 78 operated by the computer with a Transmit Instruction on line 81 and a Timing Signal on line 83. The ZERO output terminal 77 of the flag flip-flop 76 is connected to the conditioning input of a pulse gate 80. Also, when the flip-flop 76 is set, the resultant signal at its output terminal 75 clears a synch flip-flop 82.

The output pulse from the pulse gate 80 sets the synch flip-flop 82 to a "ONE" and the ONE output of this flip-flop conditions a pulse gate 84. The pulse input signals for the pulse gates 80 and 84 are derived from a clock 86. This clock generally operates independently from the computer 22.

The output from the pulse gate 84 is applied to a complement input of the alternate flip-flop 74, so that each output pulse from the gate 84 changes the condition of the flip-flop 74. The ONE output terminal 79 of the alternate flip-flop provides the pulse input signals for the pulse gates 50 and 60. The ZERO output terminal 73 of the flip-flop 74 provides the pulse input signals for the pulse gates 72 and 64.

Together, the line counter 58 and the group counter 66 of FIGURE 4, which may be conventional binary counters, constitute a scan counter 88. In the illustrated embodiment where there are two groups of data lines (FIGURE 1) the group counter 66 provides a count of two, and the line counter provides a count of four for the four data lines in each group. The flag line selector 90 in the flag scanner 24, now to be described, receives the count from the line counter 58.

As shown at the bottom of FIGURE 4, the illustrated flag line selector 90 is constructed with a conventional decoder 98 having four output terminals. Each decoder output terminal and the terminal 68, connected to the ONE output terminal of flip-flop 48, are applied to an OR circuit 96. With this arrangement the output lines 102 of the flag line selector 90 are all energized when flip-flop 48 is in the ONE state. Alternatively, the decoder 98 energizes the ONE line 102 corresponding to the number in the line counter 58.

Turning again to FIGURE 1, the group O flag mixer 32 in the flag scanner 24 is constructed with a gate 104 for each data line 14 in group O and an OR circuit 106 connected to receive the output signals from the gates 104. An output gate 108 is connected between the output of the OR circuit 106 and the flag line 36.

One input to each gate 104 is a line 102 from the flag line selector 90 and the other input is connected to the flag output terminal 30 of one of the receivers 16.

The flag mixer 34 has the same construction as the mixer 32; it receives the signals on the lines 102 from the flag line selector 90 and it is connected with the flag output terminals of the group 1 receivers.

The flag group selector 100, also shown in FIGURE 1 can be constructed as a decoder and receives the count in the group counter 66 of the scan counter 88. It is connected via lines **101*a* and 101*b* to develop the enable signals for the output gates 108 in the flag mixers 32 and 34. More specifically, when the flag group selector 100 receives the binary count 0 from the group counter 66, it enables the output gate 108 in the group 0 flag mixer 32 and disables the output gate in the mixer 34. Alternatively, when the flag group 100 receives a binary count 1, it enables the group 1 mixer 34 and disables the mixer 32**.

To consider the operation of the flag scanner 24 and the scan control 26, assume that the number zero receiver 16 in group 0 does *not* have a character but that the group 0 number one receiver has a character and develops a Flag signal at its output terminal 30. Assume further that the scan group flip-flop 48, FIGURE 4, is set, i.e. it has a ONE output signal. Thus, the pulse gate 64 is enabled and the pulse gate 60 is disabled. Further, the scan gate 42 is enabled and the flag gate 44 is disabled. The ONE level from the flip-flop 48 also appears at one input of each OR circuit 96 in the line selector 90, causing every line 102 to be energized.

Thus, when the scan group flip-flop 48 is set, the pulse gate 60 feeding the line counter 58 is disabled, the pulse gate 64 feeding the group counter 66 is enabled, and the energized lines 102 enable all the gates 104 in both flag mixers 32 and 34 (FIGURE 1). The flag scanner and scanner control are now in the Group Scan condition.

When the group counter delivers the binary number 0 to the flag group selector 100 (FIGURE 1), the gate 108 in the mixer 32 is enabled and the gate 108 in the mixer 34 is disabled. In the mixer 32, the gate **104*a* is not receiving a Flag signal, but the gate 104*b* is receiving a Flag signal from the number one receiver, which contains a received character. Thus, regardless of whether the group 0 number three and four receivers have characters, the gate 104*b* develops an output, causing the OR circuit 106 to apply a signal to the gate 108. Accordingly, the gate passes a Flag signal to the flag line 36**.

Referring to FIGURE 4, this Flag signal is applied to the enabled scan gate 42, causing it to produce an output that conditions the pulse gate 50.

Assuming that the flag flip-flop 76 has previously been cleared so that its ZERO output has conditioned the synch pulse gate 80, the next pulse from the clock 86 is passed by the gate 80 to set the synch flip-flop 82. The resultant ONE output from the flip-flop 82 conditions the pulse gate 84 and the next pulse from the clock 86 is passed by the pulse gate 84 to complement the alternate flip-flop 74, placing it in the ONE condition. The resultant change in voltage at the ONE output terminal 79 of the flip-flop 74 is passed by the enabled pulse gate 50 to clear the scan group flip-flop 48, placing it in the ZERO condition.

This disables the scan gate 42, removes the signal to all the OR circuits 96 in the flag line selector 90, enables the flag gate 44 and the pulse gate 60, and disables the pulse gate 64.

At this juncture, the flag scanner control 26 of FIGURES 1 and 4 has completed the transition from the Group Scan condition to the Line Scan condition. The transition was initiated by the Flag Siganl the scanner control received while group scanning the group 0 receivers. It occurred in the brief interval between successive clock pulses from the clock 86.

In response to the next clock pulse, the pulse gate 84 again complements the alternate flip-flop 74, placing it in the ZERO condition. However, this transition has no effect on the scanner control since the pulse gate 64 that receives the resultant voltage drop is not conditioned. Thus, the group counter still contains the 0 count identifying the data line group in which a Flag Signal was found.

At the same time, the flag line selector 90 (FIGURE 1) receives the binary number 00 from the line counter 58. In response, the selector 90 enables the gate **104*a***. This gate does not produce an output because the receiver connected thereto was not one which received a character.

Returning to FIGURE 4, in response to the next clock pulse, the pulse gate 84 sets the alternate flip-flop 74. The resultant voltage change at the flip-flop's ONE output terminal 79 is passed by the pulse gate 60 to advance the line counter 58 by one count, i.e., to 01. In response to this binary number, the flag line selector 90 places a signal on the line 102 input to the gate **104*b* of FIGURE 1. This gate simultaneously receives a signal level from the flag output 30 of the number one receiver 16 and hence delivers a signal to the OR circuit 106. The OR circuit, in response, operates the enabled gate 108 to apply signal to the flag line 36. This Flag signal developed when the scanner control is line scanning operates the enabled flag gate 44 to condition the pulse gate 72 connected with the flag flip-flop 76**.

The next clock pulse clears the alternate flip-flop 74, which applies a pulse to the conditioned pulse gate 72. In response the gate 72 sets the flip-flop 76. The resultant ONE signal from the flip-flop ONE output 75 is the Computer Notification signal for the computer. It indicates that the scanner control has located and identified a receiver having a character.

The setting of the flag flip-flop 76 disables the pulse gate 80 and clears the synch flip-flop 82. This, in turn, disables the pulse gate 84 so that subsequent pulses from the clock 86 cannot switch the alternate flip-flop 74.

At this juncture, the flag scanning operation ceases, with the scan counter 88 set to the group and line counts identifying the number one receiver in group 0. This receiver to whose Flag signal the scan control responded, will be referred to as the "active" receiver. Lines 110 and 112 deliver the identifying count from the line and group counters 58 and 66 to the computer's in-out register 38 (FIGURE 1) and to the line selector 20.

As discussed below, the Flag signal from the Active Receiver remains present, and the scanner and scanner control remain quiescent, until the character in the Active Receiver has been processed. After the Flag signal is removed, the computer delivers a Release Instruction and a timing signal to the gate 78 (FIGURE 4), to clear the flag flip-flop 76. This enables the pulse gate 80 so that the next clock pulse sets the synch flip-flop 82, which conditions the pulse gate 84. Thereafter the next clock pulse complements the alternate flip-flop 74. The flip-flop 74, which was in the ZERO condition when the flag scanning stopped to allow a character to be processed, then switches to the ONE condition, with the result that the conditioned pulse gate 60 applies a pulse to the line counter 58, advancing the count therein.

Thus, when a receiver Flag signal is cleared, and the scanner released, the scanner control 26 resumes line scanning, starting with the first line following the one whose character it just processed.

When the line counter 58 advances to the end of its count, i.e. when all the data lines in a group have been scanned, the line counter sends a signal via conductor 114 to set the scan group flip-flop 48. As discussed above, in this state, the flip-flop 48 commands the flag scanner to scan groups of data lines. This operation continues until another Flag signal is detected, at which time line scanning is resumed to locate the receiver producing the new Flag signal.

*Line selector*

The actual transfer of a character from the Active Receiver to the computer is carried out by the line selector 20, which will now be described in detail with reference to FIGURE 5.

The line selector for the illustrated interface equipment is constructed with a decoder unit indicated generally at 122. The unit 122 includes a decoder buffer 120 connected to the group and line counter lines 110 and 112. The buffer receives instructions on lines 124 from the computer. The decoder unit 122 also has "select" lines 126 connecting it to a group 0 line mixer unit 130 and "select" lines 128 connecting it to a group 1 line mixer unit 132. Each select line 126 is associated with one group 0 data line 14 and each select line 128 is associated with one group 1 data line 14.

In general, during the receiving operation, the decoder unit 122 decodes the line and group members on the lines 110, 112 and 134, and passes a timing pulse from the computer to the select line 126 or 128 associated with the Active Receiver, i.e. the receiver identified by the line and group numbers. As passed by the unit 122, this pulse operates as a Select Line pulse. In response to the Select Line pulse, the line mixer unit 130 or 132 connected with the energized select line transfers the character in the active receiver to the computer.

More specifically, the decoder buffer 120 also receives from the computer, via a bus 134, the group and line numbers of data lines on which characters are to be transmitted. The instruction lines 124 connect the buffer 120 to the computer's control element 40 to receive conventional instructions for (1) transferring the counts on the bus 134 to line decoders 136 and 138 and to a group decoder 140, and (2) alternatively, for transferring the counts on lines 110 and 112 to the decoders 136, 138 and 140.

Each of the decoders 136, 138 and 140 may have conventional construction and is turned ON and OFF with an external enable signal applied to a terminal 142 thereof.

The enable signal for the group decoder 140 is a timing pulse from the computer. The output terminals of the decoder 140 are connected to the enable terminals 142 of the line decoders 136 and 138. Thus, when enabled by the timing pulse, the group decoder 140 in turn enables the single line decoder 136 or 138 identified by the binary count it receives from the decoder buffer 120. The enabled line decoder then develops a Select Line pulse on the select line 126 or 128 identified by the binary number it receives from the buffer 120.

In addition to the connection to the mixer unit 130, each group 0 select line 126 is connected to the clear flag input terminal **162*b* (FIGURE 2) of its associated receiver 16, and to the read-in terminal 178 (FIGURE 3) of its associated transmitter 18. These connections are made with the control line 29*a*. Similarly, the control line 29*b* connects each group 1 select line 128** to its associciated receiver and transmitter.

Figure 5:
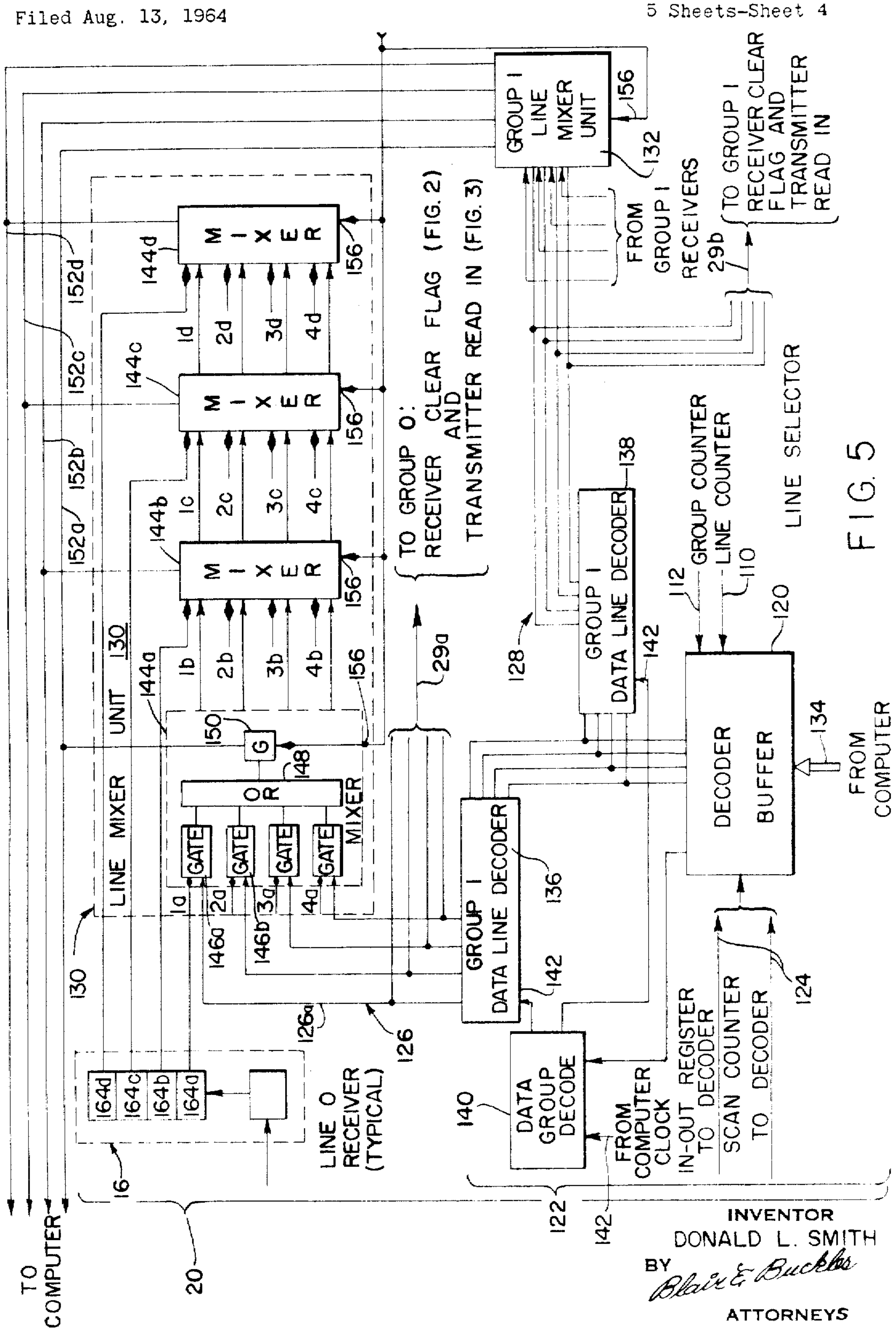
FIGURE 5 is a schematic representation of the line selector in the system of FIGURE 1.

The line mixer unit 130 may be constructed as shown in FIGURE 5, with a mixer 144 for each of the four digits in the Teletype characters. The mixer **144*a*, typical of the other mixers, has a gate 146 for each of the four data lines in group 0 and an OR circuit 148 whose inputs are the outputs of the gates 146. A gate 150 applies a Digit signal to a digit line 152*a* in response to the OR circuit output when an enable signal is applied to a terminal 156** of the mixer.

The outputs of the mixers **144*b*, 144*c* and 144*d* are similarly connected to digit lines 152*b*, 152*c* and 152*d*, respectively. It will thus be seen that there is a digit line 152** for each digit in a character.

The inputs to the gates 146 of the group 0 mixers 144 are the select lines 126 and the contents of the receivers 16. More specifically, each select line 126 is connected to one gate 146 in each mixer **144*a*–144*d*. Further, each gate 146 connected to a given select line is also connected to one flip-flop of the receiver corresponding to that select line. For example, the select line 126*a* corresponds to the number 0 receiver in group 0, shown in FIGURE 5. The gate 146*a* in mixer 144*a* is connected to both the line 126*a* and the first flip-flop 164*a* of the receiver. The gate 146*a* (not shown) in the mixer 144*b* is connected to both the line 126*a* and the second flip-flop 164*b* in the receivers. The corresponding gates 146*a* in the mixers 144*c* and 144*d* are connected to the receiver flip-flops 164*c* and 164*d***.

With this construction, when the line **126*a* is energized, to the exclusion of all the other select lines 126 and 128, the gates 146*a* in the mixers 144*a*–144*d* are enabled. This passes the contents of the receiver flip-flops 164*a*–164*d* to the gates 150 and when the gates 150 are pulsed, these digits are fed to the digit lines 152*a*–152*d*. The digit lines then carry the character stored in the receiver 16 to the computer 22**.

Similarly, if a different select line 126 or 128 is energized, the contents of a different receiver 16 will be transferred to the computer 22.

As pointed out above, the particular select line 126 or 128 which is energized depends on which receiver 16 has transmitted a Flag signal detected by the flag scanning system (FIGURE 1). The energized select line then brings about a transfer to the computer 22 of the character received by that receiver.

It should be noted that the character information in each receiver 16 is in the form of a parallel series of levels. Therefore, the contents of the active receiver appear as a series of levels at the gates 146 in the mixers 144. The gates 146 are, in effect, "strobed" be means ot the Select Line pulse on one of the select lines 126 and 128. This pulse was developed by a timing pulse from the computer applied to the terminal 142 of the data group decoder 140. Thus, the Select Line pulse synchronizes the transfer of information from the receivers 16 according to the computer operation, thereby eliminating the requirement for intervening buffer storage or like apparatus.

As discussed above with reference to FIGURES 1, 2 and 4, each receiver 16 developes a Flag signal at its output terminal 30 as it transfers a character into its shift registed. These Flag signal outputs are connected with the flag scanner 24, FIGURE 1, which scans the flag signal outputs on a group basis until a Flag signal is found. In response to the Flag signal, the flag scanner control 26 stops the group counter portion of the scan counter 88 and commands the flag scanner to examine the flag outputs in the identified group on an individual line basis until a Flag signal from a single receiver is found. In response to such a signal, the flag scanner control stops its scan counter 88 at the line and group number identifying the receiver that developed it.

The flag scanner control 24 then sends to the computer 22 the computer Notification signal. It also sends to the computer the receiver numbers stored in the scan counter; this can be done automatically or only upon request from the computer, depending on the program.

In response to the Computer Notification, at the appropriate time in its program, the computer sends the decoder buffer 120 of FIGURE 5 instructions that operate the buffer to transfer the group count on line 112 to the group decoder 140 and to transfer the line count on line 110 to the line decoders 136 and 138. The computer also sends to the terminal 142 on the data group decoder 140 a timing pulse that causes the decoder 140 to enable the line decoder 136 or 138 identified by the count in the group counter.

In addition, the computer sends a level-type signal to the terminals 156 of both line mixer units 130 and 132 so that their output gates 15 are enabled when the timing pulse operates the group counter 140.

The enabled data line decoder 136 or 138 develops a Select Line pulse on the one select line 126 or 128 identified by the contents of the line counter. This Select Line pulse operates the mixer unit gates 146 connected with the active receiver 16. As a result, the digits applied to the mixers 144 from the active receiver are transferred to the digit lines 152 and read into the in-out register of the computer.

The single Select Line pulse is also applied via line **29*a*** to the Clear Flag input terminal of the active receiver to clear its flag. The Computer Notification may also be cleared so that the scanner control will resume line scanning.

The line **29*a* also applies the Select Line pulse to the Read-In terminal 178 of the one transmitter 18 (FIGURE 1) connected with the energized select line. As shown in FIGURE 3 the pulse is applied to the pulse input terminals of the pulse gates 176, which have their conditioning input terminals 174 connected to the computer's in-out register. However, the computer is preferably programmed to clear the in-out register prior to transferring the received character from the active receiver into the in-out register. As a result, during receiving operation, the pulse gates 176** are deconditioned when the Select Line pulse is produced, so that the pulse does not transfer information into the transmitter to which it is applied.

As soon as the received character is read into the in-out register, the transmitter pulse gate 176 connected with an in-out register memory element that received a binary ONE, for example, receives a conditioning level signal. However, the pulse gate responds to an input pulse only when it has been conditioned *prior* to the input pulse. Hence, the pulse gates 176 in the transmitters 18 provide sufficient delay so that during receiving operation the select line pulse does not transfer any digits to the transmitter registers 170; the transmitters are unaffected by the select line pulse applied to their read-in terminals.

This delay provided by the pulse gates is provided with conventional circuits. For example, "so-called" capacitor-diode gate is appropriate.

*Transmitting operation*

Referring to FIGURES 1 and 5, when a character is to be transmitted on a group 1 data line, for example, the computer 22 sends to the buffer 120, via the bus 134, the binary number identifying the data line. Subsequently, from the computer in-out register 38, the character is simultaneously applied to all the transmitters 18 via the bus 28. Specifically, the character is applied to the conditioning input terminals 174 (FIGURE 3) of the pulse gates 176 in the transmitters. These two steps can be carried out as one step when there is sufficient capacity to handle both pieces of information simultaneously.

The computer control element 40 then sends, via the instruction line 124, the decoder buffer 120 (FIGURE 5) in the line selector 20 an instruction to transfer the group number in the buffer 120 to the data group decoder 140 and to transfer the line number in the buffer 120 to the line decoders 136 and 138.

The computer 22 then delivers the timing pulse to the terminal 142 of the data group decoder 140, FIGURE 5. In response to the timing pulse and the group count it received from the decoder buffer, the group decoder 140 operates the line decoder 138 to develop a Select Line pulse on its select line 128 associated with the data line identified by the line number in the buffer 120.

Prior to applying the timing pulse to the decoder 140, the computer enables all the transmitters 18 with an appropriate level sent to the transmitter enable terminals. Accordingly, all the transmitters in the interface equipment are enabled, but only one receives the Select Line pulse at its read-in input terminal 178. As a result, this one transmitter obtains from the computer the character to be transmitted.

While the transmitter is transmitting this character, its active output terminal 184 (FIGURE 3) is energized. Its flag output 182 becomes energized when transmission is completed. Illustrative functions of these signals will be discussed hereinafter.

With further reference to FIGURE 5, the Select Line pulse from the data line decoder 138 is also applied to the line mixer unit 132 in the line selector 20. However, unless the computer has sent a receiver enable signal to the mixer units 130 and 132, the Select Line pulse does not produce an output from the mixer unit.

When desired, the computer 22 can be programmed to check the accuracy of its transmitting operation during half-duplex operation. For this purpose, the computer retains in an approximate memory location or register the transmitted character and the identity of the line on which it was sent. As a result, the receiver connected to active data line receives the character as it is being sent. This receiver develops a Flag signal when the character transmission is complete and, in the manner described above, the flag scanner control sends the computer the Computer Notification signal and the identity of the receiver that developed the recognized Fag signal. The computer then, in effect, requests the received character from the line selector 20 and compares it with the character it sent to the transmitters. In the event that characters being compared are different, the computer can repeat the transmission, or perform other appropriate operations.

The computer can, alternatively, be programmed to proceed to the next operation after transmitting a character only when it receives a Computer Notification signal together with the binary number identifying the same data line on which it instructed the line selector 20 to send the character. More particularly, this information from the scanner control 26 indicates that a complete character has been received on the data line identified for transmission. Hence, the latter check indicates when transmission on the selected data line is completed.

With certain constructions of the controls 162 (FIGURE 2) of the Teletype receivers, when the receivers are being used to check the completion or the accuracy of transmission in half-duplex operation, the receiver will develop a Flag signal before the active transmitter has completed transmission. This can result, for example, when the receiver develops a Flag signal as soon as it starts to receive the last digit of a character, whereas the transmitter remains active until completion of the digit transmission.

Although the time interval between the appearance of the receiver flag and the end of the transmitting operation may be of the order $10^{-3}$ second, i.e. 1 millisecond, the receiver Flag signal generally should be inhibited until transmission is completed. This can readily be achieved by inserting a gate 190 (FIGURE 2) before the flag output terminal 30. The inputs to the gate 190 are the Flag signal from the receiver control 162 and the Transmitter Active signal produced at the output terminal 184, of the transmitter (FIGURE 3) connected to the same data line 14 as the receiver. The gate 190 then then develops the Flag signal only when the transmitter Active signal is absent, indicating that the transmitter is not in the process of transmitting a character.

The system's operation when it receives a request for information can also be enhanced with another interconnection between each receiver and transmitter associated with the same data line. More specifically, referring to FIGURES 2 and 3, with certain receiver logic, a request for information received on a data line may be transferred to the computer before the active receiver completes its full operating cycle. As a result, the computer may be ready to transmit the requested information before the receiver that obtained the request has become quiescent. This would generally be undesirable and can be prevented by connecting the receiver active output terminal 169 to the transmitter wait input terminal 172*c*. This interconnection disables the transmitter until the Receiver Active signal is removed, which occurs only when its receiving operation is completed.

In the foregoing description, the identity of the data line on which a character is to be sent is furnished to the line selector 20 from the computer 22. In an alternative mode of operation, the number in the scan counter is transferred to the line selector for this purpose.

By way of example, assume that a two digit word is to be transmitted on a selected line. To transmit out the first character, the computer sends the identity of the line to the line selector 20. During transmission of the first character, the computer program calls for an echo check on the specified data line. As a result, the receiver connected thereto develops a Flag signal. When the flag scanner 24 recognizes this Flag signal, the number in the scan counter 88 identifies the line on which the first character was sent. Accordingly, this number can be transferred to the line selector 20 to send the second character on the same data line.

*Full duplex data communication*

Figure 6:
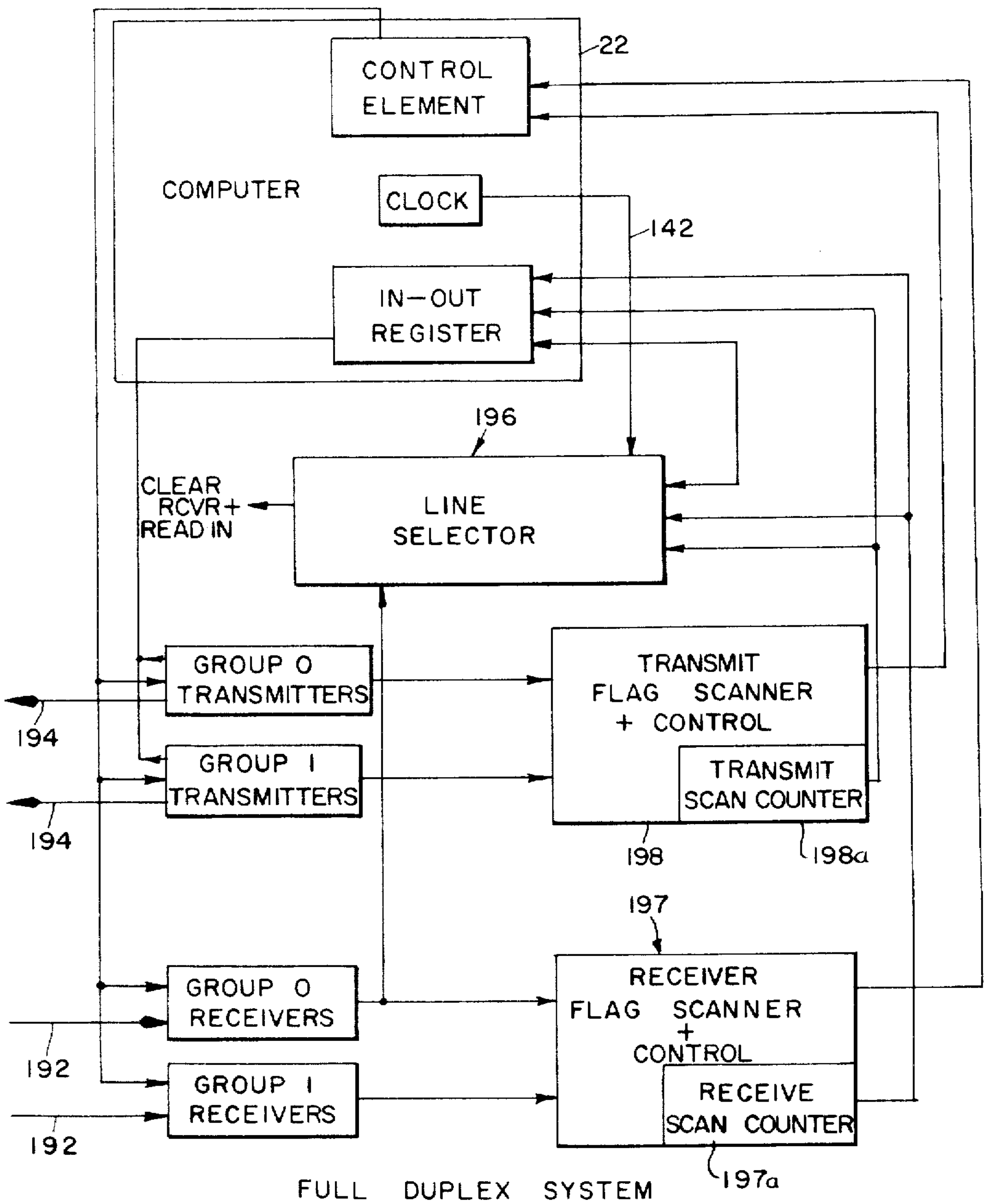
FIGURE 6 is a schematic representation of a full duplex Teletype system embodying the invention.

In a full duplex Teletype communication system, each data line is used exclusively for transmitting or for receiving, but not for both operations as in half-duplex. FIGURE 6 shows such a system in which data lines 192 used exclusively for receiving information are connected with receivers arranged in groups as in the half-duplex system of FIGURE 1. Data lines 194 connected with the transmitters 18 are used exclusively for transmitting information from the computer 22. In the illustrated full duplex system, each data receiving line 192 is preferably associated with a data transmitting line 194 and the associated lines are identified by the same group and line numbers. Accordingly, each receiver is preferably associated with a transmitter. However, for full duplex operation, the associated transmitters and receivers are not interconnected in the manner discussed above for half-duplex operations.

The Teletype receivers and transmitters for the illustrated full duplex system can be constructed as described above with reference to FIGURES 2 and 3, plus the additional controls now to be described.

Referring to the receiver of FIGURE 2, for full duplex operation, the coincidence of the Clear Flag signal of the receiver and an Enable signal, applied to the input terminal 162*c*, is used to clear the receiver Flag signal. For this purpose, the control 162 in the receiver is provided with a gate 161 having inputs connected to the input terminals 162*b* and 162*c*. The output of the gate 161 is applied to the device (not shown, suitably a flip-flop) that develops the Flag signal.

Moreover, a switch 163 (FIGURE 2) is connected between the enable input terminal 162*c* and means (not shown) for enabling the gate 161 independently of the signal at the receiver input terminal 162*c*. With this construction, for full duplex operation the switch 163 is open, as shown, and it is closed when the receiver is used in a half-duplex system.

Turning to FIGURE 3 and the receiver construction, when the last, fourth digit of a character has been transmitted, the control 172 develops a Transmitter Flag signal at the terminal 182. This signal, indicating that the transmitter has sent a character and is ready to transmit another character, is used in full duplex operation. For a full duplex system, the transmitter flag is cleared only by the coincidence of the Read In signal and the Clear Flag signal. As in the receiver of FIGURE 2, this operation can be achieved with conventional circuitry such as the gate 161 and switch 163. Thus, in full duplex operation with the preferred logic discussed below, the Flag signals from the transmitters and from the receivers are turned OFF only by the coincidence of two signals, rather than by a single signal as in the illustrated half-duplex operation.

As in the half-duplex system, the receiver flag output terminals are connected to a receive flag scanner and control 197 connected with the computer 22 and to a line selector 196. The selector 196 sends the Computer Notification signal developed in response to a receiver flag signal to the computer 22 and the control 197 sends the binary number in the receiver scan counter 197*a* to the computer and to the line selector 196.

In the full duplex system, the transmitter flag terminals 182 are examined, appropriately in the same manner as the receiver flags, to ascertain when a transmitter is ready to transmit another character. The receivers are not used to monitor the transmission operation because they are connected to different data lines from the transmitters. For this purpose, the transmitter flag output terminals 182 (FIGURE 3) are applied to a transmit flag scanner and control 198. The control 198 and the receiver unit 197 may each be identical with the flag scanner 24 and flag scanner control 26 described above with reference to FIGURES 1, 4 and 5. It should be noted that although the flag scanner and control 197 that scans the receiver flags can be made large enough to scan also the transmitter flags, the use of separate scanners and controls is generally more efficient. With such separate units, the transmitters and receivers can be more easily serviced and given different priorities. The transmit flag scanner and control 198, including a transmitter scan counter 198*a*, is connected with the computer 22 and the line selector 196 in the same manner as the receive flag scanner control 197.

A Computer Notification signal from the transmitter flag scanner and control 198 conveys to the computer the fact that the identified transmitter is ready to transmit an additional character. The computer then determines what character, if any, to send by way of the identified transmitter. In the event that no further characters are to be sent on the identified transmitter, the computer sends out signals that result in the identified transmitter's Flag signal being turned off. This operation is discussed below.

The line selector 196 of FIGURE 6 is identical with the half-duplex line selector 20 described above with reference to FIGURES 1 and 5, except that its decoder buffer, corresponding to the decoder buffer 120 in FIGURE 5, also receives the group and line counts from the transmitter scan counter 198*a*. Additionally it receives from the computer 22 instructions for transferring the contents of the transmitter scan counter 198*a* to the data group and data line decoders in the line selector. Accordingly, in response to the instructions it receives, the line selector 196 transfers one of three numbers, i.e. from the decoder buffer 120 (FIGURE 5) of the line selector 196, from the scanner and control 198 or from the scanner and control 197, to its data group and line decoders (of the type shown in FIGURE 5 for the line selector 20).

With further reference to FIGURE 6, to transmit a character on a data line 194, the computer 22 delivers the character to be transmitted to all the transmitters. The computer also sends to the line selector 196 the number identifying the data line 194 on which the character is to be sent, or instructs that the number in the transmit counter 198*a* be transferred to the line selector 196. Instructions from the computer to the line selector 196 transfer the number to the decoders in the line selector and, in response to a subsequent timing pulse from the computer, the line selector develops a Select Line pulse.

The Select Line pulse goes to the selected transmitter and also to the gates in the line mixter unit (shown in FIGURE 5 for the line selector 20) in the line selector 196 identified by the number the computer sent to the line selector. However, the line selector's mixers are not enabled, and the Select Line pulse has no effect on them.

More specifically, the computer enables all the transmitters and hence the identified transmitter responds to the Select Line pulse applied to its read-in terminal 178 (FIGURE 3). In the same manner as described above for half-duplex operation, the transmitter stores in its register the binary ONES of the character from the computer, and sends the character digits out in serial form on the data line 194 connected with it.

Before operating the line selector 196 to develop the Select Line pulse, the computer 22 also enables the "clear flag" input terminals 172*b*( FIGURE 3) of all the transmitters. Accordingly, the Select Line pulse applied to the terminal 178 of the selected transmitter also removes the flag signal from this transmitter.

The Select Line pulse is also applied to the clear flag input terminal 162*c* (FIGURE 2) of the receiver associated with the identified transmitter. However, the computer does not apply a signal to the flag enable input terminal 162*b* of the receiver, and hence the receiver's flag is unaffected by the Select Line pulse developed during transmitting operation.

During full duplex receiving operation, the computer 22 enables all the mixers in the line selector 196, all the receiver flag enable input terminals 162*b* (FIGURE 2), and does not enable the transmitter clear flag input terminals 172*b* (FIGURE 3). The computer develops the Select Line pulse by instructing the line selector 196 to read into its decoders the count from the receiver scan counter 197*a* and then sending the timing pulse to operate the decoders of the line selector.

As a result, the Line Select pulse is applied to the one receiver and one transmitter identified by the number read into the decoders of the line selector. The pulse transfers the character from the identified active receiver to the computer, and removes the Flag signal produced at this receiver. The pulse has no effect on the transmitters, since their pulse gates 176 and 180 are not conditioned when the Select Line pulse arrives.

In the event that a character is not transferred to the computer from a receiver before the receiver receives another character on its data line, the first character will be lost. Accordingly, the receiving operation generally has a higher priority than the transmitting operation in the operation of the full duplex communication system.

This priority rating can readily be accomplished by programming the computer to process the first Computer Notification signal that arises, whether in response to a transmitter or a receiver Flag signal. If the Notification signal arose from a transmitter Flag signal, and a receiver Flag signal is recognized before the Notification is fully processed, the system interrupts processing of the transmitter-produced Notification and processes the receiver-produced Notification, retaining in an appropriate storage location the information relating to the interrupted program. Thereafter, when no receiver-produced Computer Notification signal is present, processing of the interrupted transmitter-produced Notification resumes. Upon completion, the system is readily to process the next Computer Notification signal that arises.

With an alternate technique that generally involves less time, the full duplex system includes a priority circuit that receives from each flag scanner and control 197 and 198 a signal such as the Program Break Request signals. With such a priority circuit, the computer can transmit characters without interruption when no receiver Flag signals are present.

In summary, the data communication method and apparatus described above provide communication between a computer or other central data processing apparatus and any one of a plurality of data lines with efficient logic. As a result, the system achieves communication in a brief time so that it can handle a relatively heavy traffic of information. Moreover, relatively simple logic circuits suffice for the interface equipment of the system.

A single "select line" signal is developed, according to the invention, to carry out each receiving and transmitting operation. Aside from the numbers in the scan counters, this is the only signal that is uniquely identified with the data line on which a character is to be transmitted or received. To carry out all the steps required for transmitting and receiving characters, the invention efficiently combines this unique signal with signals that are applied, for example, to all the transmitters and to all the mixers in the line selector. For full duplex operation, the "select line" signal is combined with a signal that enables all the clear flag inputs of the receivers or transmitters.

The invention also provides novel and improved techniques for ascertaining when each transmitting and receiving operation is completed, thereby enhancing the rapid execution of each operation.

The novel technique for scanning data lines to provide high-speed communication on one line at a time can be used with equipment and information other than that found in Teletype communication. Thus, the data lines can be connected to a plurality of information sources and output devices in general, and the invention provides efficient communication between these terminal devices and the central data handling equipment.

It will thus be seen that the objects set forth above, among those made apparent from the preceding description, are efficiently attained, and, since certain changes may be made in carrying out the above method and in the construction set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Having described the invention what is claimed as new and secured by Letters Patent:

1. Data interface apparatus for providing communication between data processing apparatus and any one of a plurality of data lines, said interface apparatus comprising in combination (A) a plurality of ordered receiving means, each receiving means having
  (1) an input for connection with an associated data line to receive a character therefrom,
  (2) a register for storing the character it receives, and
  (3) a receiver control
    (a) developing a flag signal in response to receipt of a character at its associated receiving means input,
    (b) having a clear flag input, and
    (c) removing said flag signal in response to signal applied to said clear flag input,
(B) flag signal processing means connected with each receiving means and producing a count identifying a receiving means at which a flag signal is sensed,
(C) decoding means
  (1) connected with said flag signal means to receive said binary count,
  (2) producing in response thereto a select line signal, and
  (3) connected with said receiving means to apply said select line signal to the clear flag input of the identified receiving means, and
(D) coincidence means
  (1) having inputs connected with said registers of said receiving means,
  (2) having outputs for connection with said data processing apparatus,
  (3) connected with said decoding means to receive said select line signal, and
  (4) transferring, in response to said select line signal, the contents of the register in the identified receiving means to its outputs for delivery to said data processing apparatus.

2. The interface apparatus defined in claim 1 in which said flag signal processing means (A) comprises
  (1) a scan counter operable to sequentially change its count and
  (2) a flag scanner scanning the receivers to sense the presence of a flag signal in an ordered sesequence in response to the changing count of said scan counter, and
(B) stores the count of said scan counter at which a flag signal is sensed and produces said count identifying a receiving means with the stored count.

3. Data interface apparatus for providing communication between data processing apparatus and any one of a plurality of data lines, said interface apparatus comprising in combination (A) a plurality of first terminal means for connection with said data lines,
(B) a plurality of second terminal means for receiving data to be transmitted from said data processing apparatus,
(C) means forming a plurality of third means for applying received data to said data processing apparatus,
(D) a plurality of data transmitters, each transmitter
  (1) being associated with a data line,
  (2) having a data output connected to said first terminal means for transmitting data on its associated data line,
  (3) having a data input in circuit with said second terminal means,
  (4) having a select line input and means forming an enable input,
  (5) respond to the coincidence of a select line signal and transmitter enable signal to transfer data from its data input to its data output,
(E) a plurality of data receivers, each receiver
  (1) being associated with a data line and with a transmitter,
  (2) having a data input connected with said first terminal means to receive data from its associated data line,
  (3) having a data output in circuit with said third terminal means,
  (4) having a flag output at which it develops a flag signal upon receipt of a data unit at its data input,
(F) means forming a first coincidence circuit
  (1) connected with said receivers,
  (2) having a select line input and means forming an enable input,
  (3) responding to the coincidence of a select line signal and a receiver enable signal to transfer data received at a receiver identified by said select line signal to said third terminal means,
(G) flag signal processing means
  (1) connected with said receiver flag outputs,
  (2) connected with the select line inputs of said coincidence circuit and of said transmitters,
  (3) operable to produce a select line signal identifying a receiver developing a flag signal,
  (4) applying said select line signal to the select line input of the transmitter associated with the identified receiver,
  (5) applying said select line signal to the select line of said coincidence circuit.

4. The interface apparatus defined in claim 3

(A) in which said flag signal processing means
  (1) has first inputs connected with said receiver flag outputs,
  (2) has a second input for receiving a signal identifying a transmitter from which data is to be sent,
  (3) has an instruction input,
  (4) develops said receive select line signal in response to a first instruction signal,
  (5) develops a transmit select line signal identifying said transmitter from which data is to be sent in response to a second instruction signal, and
  (6) applies said transmit select line signal to said transmitters and to said coincidence circuit in the same manner as said receive select line signal.

5. The apparatus defined in claim 3

(A) in which each transmitter develops a transmitter flag signal upon completion of a transmitting operation, and
(B) further comprising transmitter flag signal processing means
  (1) connected with said transmitters to receive said transmitter flag signals, and
  (2) producing a transmitter ready signal identifying a transmitter that developed a flag signal.

6. Teletype interface apparatus for providing communication between data processing apparatus and any one of a plurality of Teletype lines, said interface apparatus comprising in combination (A) a plurality of ordered Teletype transmitters, each transmitter
  (1) having a data input,
  (2) having a data output,
  (3) having a register connected between its input and output, and (4) being operable to transfer a data unit from its register to its data output, (B) a plurality of transmitter coincidence means, each transmitter coincidence means (1) having an output connected with said data input of an associated transmitter, (2) having two inputs, and (3) responding to the coincidence of signals at both inputs thereof to transfer a data unit into its associated transmitter register, (C) means forming an interface output for received data, (D) a plurality of ordered data receivers, each receiver (1) being associated with a transmitter, (2) having data input, (3) having data output in circuit with said interface output, (4) including register means (a) in circuit between its data input and data output, (b) storing data received at its data input and applying it to its data output, and (5) having a flag output at which it develops a flag signal upon receipt of a data unit, (E) a plurality of receiver coincidence means, each receiver coincidence means (1) being in circuit with the data output of an associated receiver and with said interface output, (2) having two inputs, and (3) responding to the coincidence of signals at both inputs to transfer a data unit from the register of its associated receiver to said interface output, (F) a flag scanner connected with the flag outputs of different receivers and developing a ready count identifying a receiver having a flag signal, and (G) a decoder (1) connected with said flag scanner to receive said ready count, (2) developing a select line signal corresponding to the receiver said ready count identifies, and (3) applying said select line signal to one input of the receiver coincidence means connected with the identified receiver and to one input of the identified receiver's associated transmitter coincidence means.

7. The interface apparatus defined in claim 6

(A) further comprising gate means (1) having a first count input connected with said flag scanner to receive said ready count, (2) having a second count input for receiving a count identifying a transmitter from which a data unit is to be transmitted, (3) having an output, (4) having an instruction input and, (5) applying to its output one of said input counts in response to the signals applied to its instruction input, and (B) in which said decoder (1) is connected to said gate means output, (2) develops said select line signal corresponding to the identified transmitter when it receives said transmitter identifying count, and (3) applies said select line signal corresponding to an identified transmitter to one input of the transmitter coincidence means connected with the identified transmitter and to one input of the identified transmitter's associated receiver coincidence means.

8. The interface apparatus defined in claim 6 for operation with $n$-digit data units and in which (A) each transmitter data input comprises $n$-input terminals, (B) each transmitter register has $n$-inputs connected with said $n$-input terminals and reads in the digits of a data unit in parallel form, (C) said decoder (1) has one output terminal for each transmitter and its associated receiver, and (2) develops select line signals corresponding to different receivers at different output terminals, (D) said transmitter coincidence means comprises $n$-pulse gates, said pulse gates having (1) $n$-outputs connected to different input terminals of their associated transmitter, (2) $n$-conditioning inputs constituting one coincidence means input, and (3) $n$-signal inputs constituting the other coincidence means input and connected to one decoder output terminal.

9. The interface apparatus defined in claim 6 in which each receiver coincidence means includes gate means operable to prevent a data unit from being transferred from a receiver to said interface output in response to a select line signal.

10. Digital data communication apparatus for transferring data received on any one of a plurality of data lines to data processing equipment, said system having (A) a plurality of data receivers each having (1) means for storing the digital data it receives from a data line to which it is connected, (2) means for producing a flag signal when it has received a complete data unit, (B) flag signal processing means sensing the presence of flag signals, and producing a signal identifying a receiver that is developing a flag signal, (C) terminal means for connection with said data processing equipment, (D) a plurality of line-selecting coincidence circuits each of which (1) has a line-selecting conductor connected to it, (2) is associated with one receiver, and (3) transfers data from its associated receiver to said terminal means when the line-selecting conductor connected to it is energized, and (E) decoding means energizing one said line-selecting conductor in response to said identifying signal from said flag signal processing means.

11. Apparatus for communicating data between data processing apparatus and any one of a plurality of data lines, said apparatus comprising (A) transmitting means operable to transmit multiple digit data units on selected ones of said data lines on a bit-by-bit serial basis, (B) receiving means operable to receive data units from selected ones of said data lines, (C) storage means for storing data unit digits supplied to said transmitting means, (D) control means for causing said transmitting means and said receiving means to operate with the same data line simultaneously, and (E) a comparing circuit having (1) means for comparing the number of data unit digits stored in said storing means and the number of data unit digits received on a selected data line, and (2) means for developing a control signal when the number of digits stored in said storing means has been received in character sequence on a selected data line.

12. Apparatus for communicating data between data processing apparatus and any one of a plurality of data lines, said apparatus comprising (A) a plurality of data transmitters, each connected to a data line, (B) a plurality of data receivers (1) each of which is associated with one transmitter and is connected to the same data line as the associated transmitter,
(2) each of which develops a flag signal when it has received a character from the data line to which it is connected,
(C) control means including
(1) means for delivering a character to a selected transmitter,
(2) means causing the selected transmitter to send said character on the data line connected thereto and,
(3) means for simultaneously operating the receiver associated with the selected transmitter,
(D) flag signal responsive means in circuit with said receivers and developing an output signal in response to a flag signal from said receiver associated with said selected transmitter,
(E) memory means for storing said character delivered to said selected transmitter, and
(F) comparing means
(1) connected with said memory means and with said receivers, and
(2) arrayed to compare the character received on the receiver associated with the selected transmitter and the character delivered to said transmitter.

13. Data communication apparatus according to claim 10 further comprising disable means selectively operable to render said coincidence circuits unresponsive to an energized line-selecting conductor.

14. Digital data communication apparatus for transferring data received on any one of a plurality of data lines to data processing equipment, said system having
(A) a plurality of data receiving means each of which is arranged to store the digital data it receives from the data line to which it is connected,
(B) first and second terminal means for connection with said data processing equipment,
(C) a plurality of transmitting means each of which is arranged to transfer data applied to said second terminal means to the data line to which it is connected,
(D) line-selecting means responsive to a select-line signal to transfer data units from one said receiving means to said first terminal means and to operate one said transmitter means to transfer data units from said second terminal means to a data line, and
(E) disable means selectively operable to render all said transmitting means inoperative, so that said line-selecting means can transfer a data unit from a receiving means to said first terminal means without operation of said transmitting means.

15. Data communication apparatus according to claim 14
(A) in which each transmitting mans produces a transmitter flag signal when it finishes transferring data to a data line, and
(B) further comprising transmitter flag signal processing means producing a transmitter ready signal identifying a transmitting means developing a flag signal.

16. Data communication apparatus according to claim 15
(A) in which said transmitting means and said receiving means are connected to different data lines,
(B) in which each said receiving means produces a flag signal when it has received a data unit, (C) further comprising receiver signal processing means producing a receiver ready signal identifying a receiver developing a flag signal, and
(D) further comprising priority means arranged to process said transmitter ready signal only in the absence of a receiver ready signal.

17. In apparatus for communicating data between data processing apparatus and any one or more of a plurality of data lines, the combination comprising
(A) transmitting means operable to transmit data units on selected ones of said data lines,
(B) receiving means operable to receive data units from selected ones of said data lines,
(C) means for storing data units supplied to said transmitting means,
(D) control means for causing said transmitting means and said receiving means to operate with the same data line simultaneously, and
(E) means for comparing a stored data unit with data said receiving means receives in a selected time.

18. Data interface apparatus for providing communication between data processing apparatus and any one of a plurality of data lines, said interface apparatus comprising
(A) means forming an interface input for receiving data signals to be transmitted from said data processing apparatus,
(B) a plurality of transmitting means, each transmitting means
(1) having a data output for connection with a data line,
(2) having a data input in circuit with said interface input,
(3) having a control input, and
(4) arranged to transfer data signals applied to its data input to its data output when it receives a transmit signal,
(C) line-selecting means
(1) having an input for connection with said data processing apparatus to receive information identifying the transmitting means from which data is to be transmitted, and
(2) applying a transmit signal to said transmitting means said information identifies,
(D) receiving means having inputs for connection with said data lines for receiving data signals applied thereto by a transmitting means, and
(E) switching means connected with said receiving means and operable to transfer data signals from said receiving means to said data processing means, so that data delivered to a transmitting means can simultaneously be received with said receiving means.

References Cited

UNITED STATES PATENTS

| | | | |
|---|---|---|---|
| 2,242,196 | 5/1941 | Thompson et al. | 178—69 |
| 2,910,238 | 10/1959 | Miles et al. | 235—167 |
| 3,063,036 | 11/1962 | Reach et al. | 340—172.5 |
| 3,215,987 | 11/1965 | Terzian | 340—172.5 |
| 3,222,647 | 12/1965 | Strachey | 340—172.5 |
| 3,297,996 | 1/1967 | Grady | 340—172.5 |
| 3,312,945 | 4/1967 | Berezin et al. | 340—172.5 |

ROBERT C. BAILEY, *Primary Examiner.*

R. RICKERT, *Assistant Examiner.*